United States Patent
Xu et al.

(10) Patent No.: US 9,982,197 B2
(45) Date of Patent: May 29, 2018

(54) DRY DISTILLATION REACTOR AND METHOD FOR RAW MATERIAL OF HYDROCARBON WITH SOLID HEAT CARRIER

(71) Applicant: INSTITUTE OF PROCESS ENGINEERING, CHINESE ACADEMY OF SCIENCES, Beijing (CN)

(72) Inventors: Guangwen Xu, Beijing (CN); Rongcheng Wu, Beijing (CN); Shiqiu Gao, Beijing (CN); Chun Zhang, Beijing (CN); Pengwei Dong, Beijing (CN); Jiangze Han, Beijing (CN)

(73) Assignee: INSTITUTE OF PROCESS ENGINEERING, CHINESE ACADEMY OF SCIENCES, Beijing (CN)

( * ) Notice: Subject to any disclaimer, the term of this patent is extended or adjusted under 35 U.S.C. 154(b) by 213 days.

(21) Appl. No.: 14/916,597

(22) PCT Filed: Aug. 14, 2013

(86) PCT No.: PCT/CN2013/081446
§ 371 (c)(1),
(2) Date: Mar. 4, 2016

(87) PCT Pub. No.: WO2015/018099
PCT Pub. Date: Feb. 12, 2015

(65) Prior Publication Data
US 2016/0215221 A1    Jul. 28, 2016

(30) Foreign Application Priority Data

Aug. 9, 2013  (CN) .......................... 2013 1 0346633

(51) Int. Cl.
*C10B 49/18*      (2006.01)
*C10B 27/06*      (2006.01)
(Continued)

(52) U.S. Cl.
CPC .............. *C10B 49/18* (2013.01); *C10B 27/06* (2013.01); *C10B 53/00* (2013.01); *C10B 53/02* (2013.01);
(Continued)

(58) Field of Classification Search
CPC ......... C10B 27/06; C10B 49/18; C10B 53/00; C10B 53/02; C10B 53/06; C10G 1/02; F23C 10/10
See application file for complete search history.

(56) References Cited

PUBLICATIONS

Machine translation of Cao (CN102424757 A), Apr. 25, 2012.*
(Continued)

*Primary Examiner* — Brian A McCaig
(74) *Attorney, Agent, or Firm* — Goldilocks Zone IP Law

(57) ABSTRACT

A dry distillation reactor for a raw material of hydrocarbon with a solid heat carrier is provided. An inner component with a pore path or a pore space is arranged inside the reactor to form a flow channel for the gas-phase product of the dry distillation. Also a dry distillation method using the dry distillation reactor is provided. The dry distillation method includes moving the reacting materials from top to bottom; moving a gas-phase product of the dry distillation along a designed path in the reactor; and finally leading same out through an outlet arranged in a central collecting channel for the gas-phase product of the dry distillation.

7 Claims, 5 Drawing Sheets

(51) Int. Cl.
*C10B 53/00* (2006.01)
*C10B 53/02* (2006.01)
*C10B 53/06* (2006.01)
*C10G 1/02* (2006.01)
*F23C 10/10* (2006.01)

(52) U.S. Cl.
CPC ............... *C10B 53/06* (2013.01); *C10G 1/02* (2013.01); *F23C 10/10* (2013.01); *Y02E 50/14* (2013.01)

(56) References Cited

PUBLICATIONS

Machine translation of He et al (CN102417822 A), Apr. 18, 2012.*
Written Opinion of the International Searching Authority for PCT/CN13/081446, dated May 12, 2014.*

* cited by examiner

US 9,982,197 B2

DRY DISTILLATION REACTOR AND METHOD FOR RAW MATERIAL OF HYDROCARBON WITH SOLID HEAT CARRIER

CROSS REFERENCE TO RELATED PATENT APPLICATIONS

This application claims the benefit under 35 U.S.C. Section 371, of PCT International Application No. PCT/CN2013/081446, filed on Aug. 14, 2013, which claims foreign priority to Chinese Patent Application No.: 2013103466333, filed on Aug. 9, 2013, both of which are hereby incorporated by the references in their entireties.

TECHNICAL FIELD

This present invention relates to the technical field of energy and chemical industry of solid fuels, and particularly, this invention relates to a reactor and method for pyrolyzing hydrocarbon materials by solid heat carrier.

BACKGROUND ART

The hydrocarbon materials include coal, oil shale, biomass, oil sand, municipal solid waste and industrial by-product such as absorbent particles with absorbed organic matters and the like, and they are suitable for extracting high-value chemicals to realize its high-value utilization because of its rich contents of organic components. Carbonization is an effective method to extract high-value oil products from solid hydrocarbon materials, wherein the produced liquid-phase products could be used as the alternative to fuel oil and also contain abundant raw chemicals such as benzene, toluene, xylene, phenol, cresol and xylenol, etc. and thus present important application value. The methods for heat and mass transfer in carbonization process significantly affect the final utilization efficiency of materials and compositions of end products, and are the main technical means of regulating the carbonization process.

At present, the carbonization technologies are divided into two classes of underground and aboveground retorting. The present underground retorting has not been widely used in industry since it is difficult to control the process and it will easily lead to the underground oil and gas pollutions. The aboveground retorting refers to a process of crushing and screening the hydrocarbon materials to desired particle size, and then heating the particles in different retorts to produce different pyrolysis products. According to different heating methods, the aboveground retorting techniques can be classified into indirect heating and direct heating. Indirect heating retort refers to a method of transferring the required heat for carbonization into the retorting chamber via the reactor wall, which has very low heat efficiency and is also hard to scale up, so that this method is seldom applied in industrial production. The direct heating retort is called as internal heating retort and can be classified into gas heat carrier and solid heat carrier according to different heat carriers, of which the heat sources are generally from the combustion of pyrolysis gas or solid products. Taking oil shale pyrolysis technology as an example, different types of carbonization furnace are adapted in gas heat carrier pyrolysis technologies, wherein the representative techniques include Petrosix technology in Brazil, Kiviter technology in Estonia, SGR pyrolysis technology of the Union Oil Company in USA, Joesco pyrolysis technology in Japan and Fushun retorting technology in China, etc. The solid heat carrier pyrolysis technologies include Tosco-II pyrolysis technology in USA, Galoter technology in Estonia, LR technology in Germany, ATP technology in Canada and pyrolysis technology developed by Dalian University of Technology (DG Process) in China. Although there has been a variety of pyrolysis technologies adapted for different hydrocarbon materials and some of them are even applied to industry, they still suffer from various problems in the operation process. As for gas heat carrier pyrolysis technologies, the key issue is that the utilization efficiency of materials and heat efficiency of apparatus are low and only solid materials in block can be processed. And as for solid heat carrier pyrolysis technologies, problems lie in huge equipment, complex structure, large power consumption, and low yield in pyrolysis oil, etc. Meanwhile, the above-mentioned carbonization processes have a common problem that the produced oils have high contents of dust and heavy components, which will directly affect the continuous operation of apparatus and subsequent processing of products.

In order to solve the problem that oils obtained from the prior pyrolysis methods have high contents of dust and heavy components, it is necessary to design anew reactor and method. Only in this way, it is possible to provide a new way for solving the energy issue.

SUMMARY OF THE INVENTION

The object of this invention is to provide a reactor and method for pyrolyzing hydrocarbon materials by solid heat carrier. The carbonization reactor and related method based on this carbonization reactor solve the problems existing in the current carbonization methods for hydrocarbon materials, such as having high contents of dust and heavy components in the pyrolysis oil, and it also overcomes the technical disadvantages of low efficiency and slow rate of heat and mass transfer existing for the current carbonization processes.

In order to achieve the above-mentioned objects, this invention adopts the following technical solutions.

A carbonization reactor for pyrolyzing hydrocarbon materials by solid heat carrier of the invention includes:

A first internals 1 with holes 11 or interstices 12, which is fixed to the top of the carbonization reactor; and a surrounding pyrolysis gas-phase product channel 3 is formed between the first internals 1 and the wall of carbonization reactor 2, and the lower end of the surrounding pyrolysis gas-phase product channel 3 is open in a material layer 4 of the carbonization reactor.

A second internals 5 with holes 11 or interstices 12 is mounted in the center of the carbonization reactor, and therein a central pyrolysis gas-phase product channel 6 is formed, and the central pyrolysis gas-phase product channel 6 has its upper end closed which is vertically opposite to the feeding inlet 9 of the carbonization reactor, and the lower end of the central pyrolysis gas-phase product channel 6 is open in the material layer 4 of the carbonization reactor, and a pyrolysis gas-phase product outlet 7 is positioned at the upper part of the central pyrolysis gas-phase product channel 6;

A material channel for the solid materials is formed from top to bottom between the surrounding pyrolysis gas-phase product channel 3 and the central pyrolysis gas-phase product channel 6.

According to an embodiment of the present invention, the holes 11 are one or more kinds of holes in rhombic, rectangular or circular shape. The persons skilled in the art can design the holes 11 with other shapes as required, such as triangular gas collecting holes and starlike gas collecting holes etc., by which the pyrolysis gas-phase products (e.g. gas, small particles) can pass through.

In the present invention, the interstices 12 are a kind of louver-shape interstices, or interstices between components of the internals, wherein the holes 11 or the interstices 12 can be positioned in each internals of the components. The persons skilled in the art can design the interstices 12 with other shapes as required, by which the pyrolysis gas-phase products (e.g. gas, small particles) can pass through.

The holes 11 or the interstices 12 are provided on the first internals 1 and the second internals 5 of the present invention to form a flow path for the pyrolysis gas-phase products, and the internals also provide a support for the solid materials in the carbonization reactor.

In the present invention, the surrounding pyrolysis gas-phase product channel 3 is an annular interconnected channel, or a wall channel which is formed between the wall of the carbonization reactor and the first internals 1 in the two opposite sides of the carbonization reactor and separated by the material layer within which the central pyrolysis gas-phase product channel 6 is.

In the present invention, the shape or configuration of the carbonization reactor is cylindrical or prismatic. The persons skilled in the art can also design the carbonization reactor with other shape as required, such as a trapezoid column etc.

In the present invention, the holes 11 or interstices 12 are arranged in the second internals 5 which begin at one tenth to one third length of the second internals 5 from the top end so that a top-enclosed space 13 with an outlet is formed in the upper part of the central pyrolysis gas-phase product channel 6. The top-enclosed space 13 formed in the upper part of the central pyrolysis gas-phase product channel 6 is provided to make the holes 11 or the interstices 12 at the lower part of the internals fully buried in the material layer 4, so that the central pyrolysis gas-phase product channel 6 is fully in the material layer 4. The persons skilled in the art can choose the length of the internals without the holes 11 or interstices 12 as required, such as two thirds length of the internals etc.

In the present invention, the lower ends of the surrounding pyrolysis gas-phase product channel 3 and the central pyrolysis gas-phase product channel 6 are arranged on the same horizontal level. The persons skilled in the art can select the relative positions of the two ends of the internals as required, for example, the position of one end of internals is higher than the other one.

The carbonization method based on the above-mentioned carbonization reactor for hydrocarbon materials by solid heat carrier, the method includes the steps of:

The high-temperature solid heat carrier particles in an ash bin 20 and the hydrocarbon materials for carbonization in a feeding system 21 are fully mixed in a solid-solid mixer 14 to obtain the before-reaction solid materials; the before-reaction solid materials enter the carbonization reactor from the feeding inlet 9 and are heated to release gas-phase products; the gas-phase products upward pass through the material layer 4 into an upper space 8 of the carbonization reactor, and then enter the surrounding pyrolysis gas-phase product channel 3 through the holes 11 or interstices 12 on the first internals 1; and then successively pass through the holes 11 or interstices 12 on the first internals 1, the material layer 4 and the holes 11 or interstices 12 on the second internals 5 until into the central pyrolysis gas-phase product channel 6, and finally exhaust through the pyrolysis gas-phase product outlet 7 into a post-processing and product collection system.

The carbonization method can further includes the following steps: the pyrolysis gas-phase products obtained from carbonization are discharged from the pyrolysis gas-phase product outlet 7 and enter a post-processing and product collection system; the produced solid materials after reaction are discharged from a material outlet 10 and transmitted into an concurrent upward oxidation reactor 18 to obtain a gas-solid mixtures by reacting with the air or oxygen supplied from the bottom of the oxidation reactor 18; the gas-solid mixtures are separated by a cyclone separator 19, and the separated solid particles with high temperature are recycled into the solid-solid mixer 14 as high-temperature solid heat carrier particles, and the separated gases are discharged as flue gas and sent to downstream processing.

The post-processing and product collection system can comprise the following steps: the pyrolysis gas-phase products are transmitted into a heat exchanger 15 to be separated into gas and liquid, which are respectively stored in a gas storage 16 and a liquid storage 17.

In the present invention, the fine particle materials carried by the gas-phase products are detained and return to the lower end of the surrounding pyrolysis gas-phase product channel 3 when the gas-phase products enter the material layer 4 from the surrounding pyrolysis gas-phase product channel 3, and thus the particles will return to the material layer 4 again.

The hydrocarbon materials are fluidizing solid particles that are rich in hydrogen and carbon.

The fluidizing solid particles with rich hydrogen and carbon are one or more kinds of materials from coal, biomass (such as distiller's grain, drug dregs, sauce dregs, fungus dregs, etc.), oil shale, oil sand, municipal solid waste (such as household waste, electrical components, etc.) and industrial by-product (such as the absorbent particles with absorbed organic matters, the used catalyst, etc.).

According to the present invention, the internals with the holes or interstices are mounted in the carbonization reactor to form a flow path for the pyrolysis gas-phase products in the moving-bed reactor. The process of heat and mass transfer are strengthened by directionally regulating the releasing channel or path of the pyrolysis gas-phase products. And the present invention fully utilizes the characters of structure of the internals in the reactor and the distribution of the material layer, and thus forms a carbonization method by which high quality of oils with low content of dust can be obtained.

Due to the filtration and reforming by the material layer, the fine particles and heavy components carried by the gas-phase products are removed and thus the obtained oils have low contents of dust and heavy components.

Figure 1:
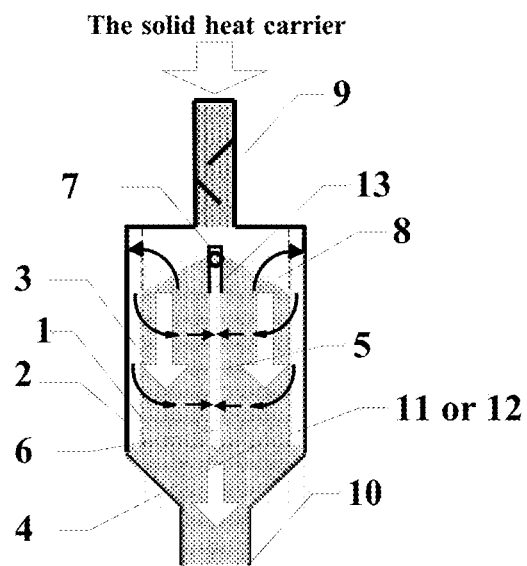
FIG. 1 is a structural schematic diagram of the carbonization reactor for hydrocarbon materials by solid heat carrier of an embodiment of the present invention.

| The reference numeral and symbols: | |
|---|---|
| → The gas-phase products escaping path | ⟹ The material moving path |
| 1. The first internals | 2. The wall of carbonization reactor |
| 3. The surrounding pyrolysis gas-phase product channel | 4. The material layer |
| 5. The second internals | 6. The central pyrolysis gas-phase product channel |
| 7. The pyrolysis gas-phase product outlet | 8. The upper space |
| 9. The feeding inlet | 10. The material outlet |
| 11. The holes | 12. The interstices |
| 13. The top-closed space with an outlet | 14. The solid-solid mixer |
| 15. The heat exchanger | 16. The gas storage |
| 17. The liquid storage | 18. The oxidation reactor |
| 19. The cyclone separator | 20. The ash bin |
| 21. The feeding system | |

DETAILED DESCRIPTION OF THE EMBODIMENT

The invention will be illustrated in the following with reference to the accompanying drawings and specific embodiments.

Embodiment 1

As shown in FIG. 1, a carbonization reactor for hydrocarbon materials by solid heat carrier according to the present invention is provided. A first internals 1 with holes 11 is fixed to the top of the carbonization reactor, and a surrounding pyrolysis gas-phase product channel 3 is formed between the first internals 1 and the wall of carbonization reactor 2, and the lower end of the surrounding pyrolysis gas-phase product channel 3 is open in the material layer 4 of the carbonization reactor.

A second internals 5 with holes 11 is mounted in the center of the carbonization reactor, and therein a central pyrolysis gas-phase product channel 6 is formed, and the central pyrolysis gas-phase product channel 6 has its upper end closed which is vertically opposite to the feeding inlet 9 of the carbonization reactor, and the lower end of the central pyrolysis gas-phase product channel 6 is open in the material layer 4 of the carbonization reactor, and a pyrolysis gas-phase products outlet 7 is positioned at the upper part of the central pyrolysis gas-phase product channel 6.

A material channel for the solid materials is formed from top to bottom between the surrounding pyrolysis gas-phase product channel 3 and the central pyrolysis gas-phase product channel 6.

Figure 5:
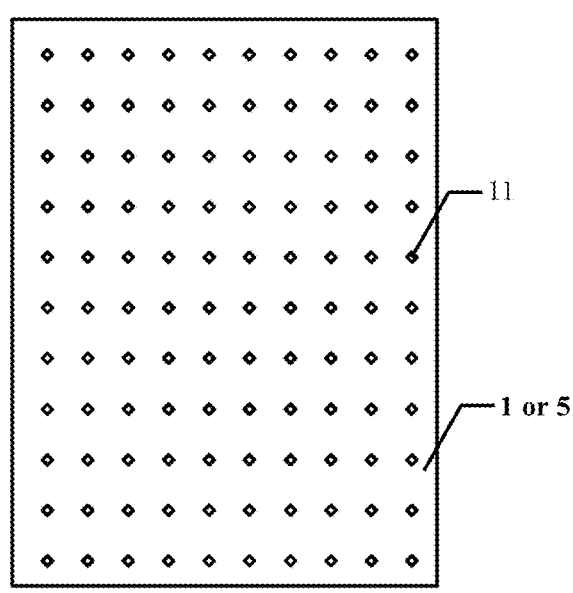
FIG. 5 is a distribution schematic diagram of the rhombic gas collecting holes arranged on the internals.
Figure 6:
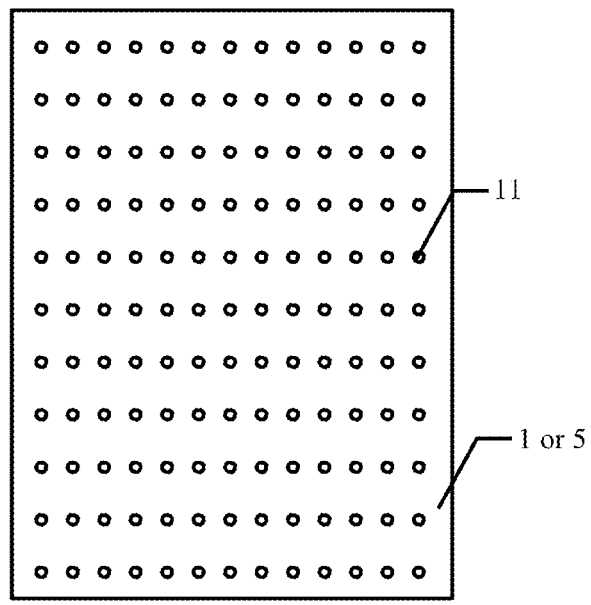
FIG. 6 is a distribution schematic diagram of the rounded gas collecting holes arranged on the internals.

As shown in FIG. 5 and FIG. 6, the holes 11 arranged on the first internals 1 and the second internals 5 in this embodiment are rhombic or circular gas collecting holes.

Figure 2:
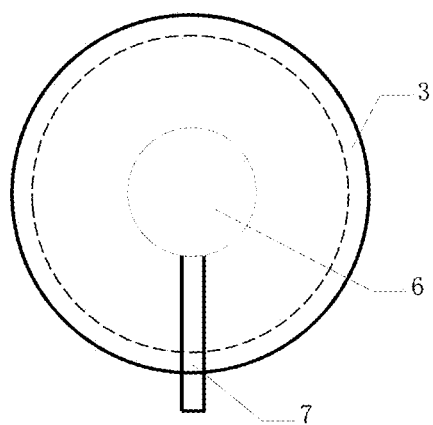
FIG. 2 is a distribution diagram of the internals of cylindrical carbonization reactor of the invention.

As shown in FIG. 2, the shape of the carbonization reactor in this embodiment is cylindrical, and the surrounding pyrolysis gas-phase produce channel 3 is an annular interconnected channel.

In the embodiment 1, the holes 11 are arranged in the second internals 5 which begin at one tenth length of the second internals 5 from the top end so that a top-enclosed space 13 with an outlet is formed in the upper part of the central pyrolysis gas-phase product channel 6.

In the embodiment 1, the lower ends of the surrounding pyrolysis gas-phase product channel 3 and the central pyrolysis gas-phase product channel 6 are arranged on the same horizontal level.

Embodiment 2

As shown in FIG. 1, a carbonization reactor for hydrocarbon materials by solid heat carrier according to the present invention is provided. A first internals 1 with interstices 12 is fixed to the top of the carbonization reactor, and a surrounding pyrolysis gas-phase product channel 3 is formed between the first internals 1 and the wall of carbonization reactor 2, and the lower end of the surrounding pyrolysis gas-phase product channel 3 is open in the material layer 4 of the carbonization reactor.

A second internals 5 with interstices 12 is mounted in the center of the carbonization reactor, and therein a central pyrolysis gas-phase product channel 6 is formed, and the central pyrolysis gas-phase product channel 6 has its upper end closed which is vertically opposite to the feeding inlet 9 of the carbonization reactor, and the lower end of the central pyrolysis gas-phase product channel 6 is open in the material layer 4 of the carbonization reactor, and a pyrolysis gas-phase products outlet 7 is positioned at the upper part of the central pyrolysis gas-phase product channel 6.

A material channel for the solid materials is formed from top to bottom between the surrounding pyrolysis gas-phase product channel 3 and the central pyrolysis gas-phase product channel 6.

Figure 8:
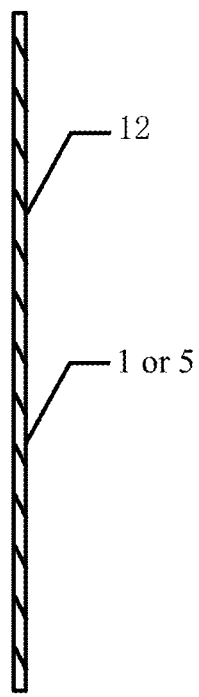
FIG. 8 is a distribution schematic diagram of the louver-shape interstices arranged on the internals.

As shown in FIG. 8, the interstices 12 arranged on the first internals 1 and the second internals 5 in this embodiment are louver-shape interstices.

Figure 3:
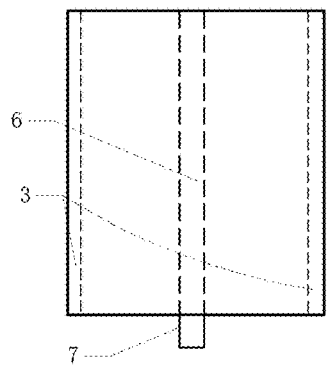
FIG. 3 is a distribution diagram of the internals of prismatic carbonization reactor of the invention.

As shown in FIG. 3, the shape of the carbonization reactor in this embodiment is prismatic, and the surrounding pyrolysis gas-phase produce channel 3 is a wall channel which is formed between the wall of the carbonization reactor and the first internals 1 in the two opposite sides and separated by the material layer containing the central pyrolysis gas-phase product channel 6.

Figure 9:
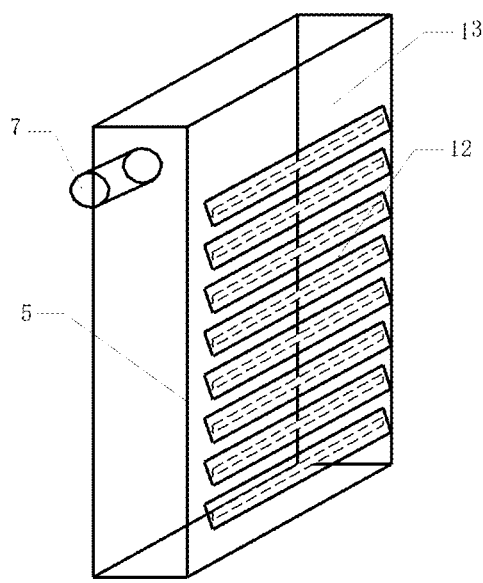
FIG. 9 is a structural diagram of the second internals of the invention.

As shown in FIG. 9, in the embodiment, the interstices 12 are arranged on the second internals 5 which begin at one sixth length of the second internals 5 from the top end so that a top-enclosed space 13 with an outlet is formed in the upper part of the central pyrolysis gas-phase product channel 6.

In the embodiment, the lower ends of the surrounding pyrolysis gas-phase product channel 3 and the central pyrolysis gas-phase product channel 6 are arranged on the same horizontal level.

Embodiment 3

As shown in FIG. 1, a carbonization reactor for hydrocarbon materials by solid heat carrier according to the present invention is provided. A first internals 1 with holes 11 is fixed to the top of the carbonization reactor, and a surrounding pyrolysis gas-phase product channel 3 is formed between the first internals 1 and the wall of carbonization reactor 2, and the lower end of the surrounding pyrolysis gas-phase product channel 3 is open in the material layer 4 of the carbonization reactor.

A second internals 5 with holes 11 is mounted in the center of the carbonization reactor, and therein a central pyrolysis gas-phase product channel 6 is formed, and the central pyrolysis gas-phase product channel 6 has its upper end closed which is vertically opposite to the feeding inlet 9 of the carbonization reactor, and the lower end of the central pyrolysis gas-phase product channel 6 is open in the material layer 4 of the carbonization reactor, and a pyrolysis gas-phase products outlet 7 is positioned at the upper part of the central pyrolysis gas-phase product channel 6.

A material channel for the solid materials is formed from top to bottom between the surrounding pyrolysis gas-phase product channel 3 and the central pyrolysis gas-phase product channel 6.

Figure 7:
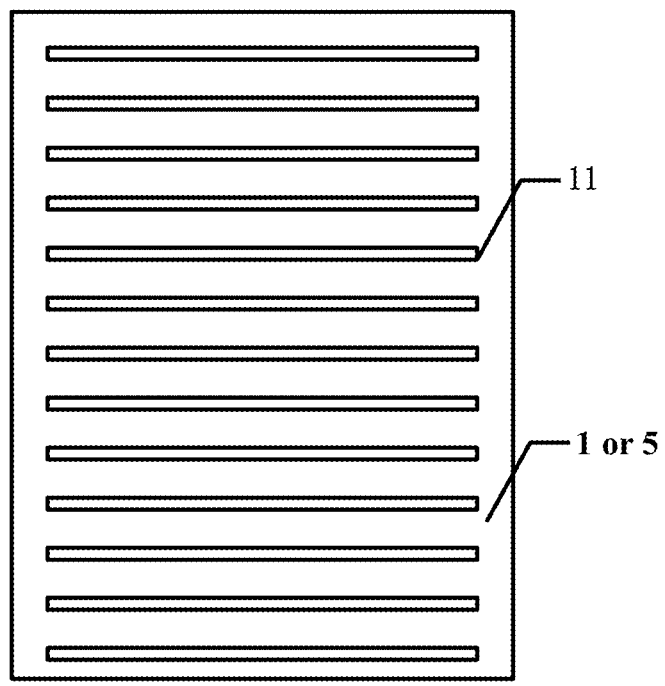
FIG. 7 is a distribution schematic diagram of the rectangular gas collecting holes arranged on the internals.

As shown in FIG. 7, the holes 11 arranged on the first internals 1 and the second internals 5 in this embodiment are rectangular gas collecting holes.

Figure 4:
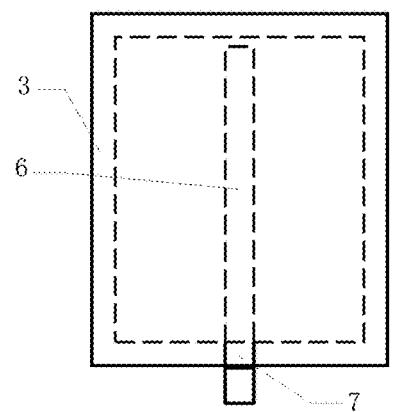
FIG. 4 is a distribution diagram of the internals of another prismatic carbonization reactor of the invention.

As shown in FIG. 4, the shape of the pyrolysis reactor in this embodiment is prismatic, and the surrounding pyrolysis gas-phase produce channel 3 is an annular interconnected channel.

In the embodiment, the holes 11 are arranged on the second internals 5 which begin at one third length of the second internals 5 from the top end so that a top-enclosed space 13 with an outlet is formed in the upper part of the central pyrolysis gas-phase product channel 6.

In the embodiment, the position of the lower end of the surrounding pyrolysis gas-phase product channel 3 is lower than that of the central pyrolysis gas-phase product channel 6.

Embodiment 4

As shown in FIG. 1, a carbonization reactor for hydrocarbon materials by solid heat carrier according to the present invention is provided. A first internals 1 with interstices 12 is fixed to the top of the carbonization reactor, and a surrounding pyrolysis gas-phase product channel 3 is formed between the first internals 1 and the wall of carbonization reactor 2, and the lower end of the surrounding pyrolysis gas-phase product channel 3 is open in the material layer 4 of the carbonization reactor.

A second internals 5 with interstices 12 is mounted in the center of the carbonization reactor, and therein a central pyrolysis gas-phase product channel 6 is formed, and the central pyrolysis gas-phase product channel 6 has its upper end closed which is vertically opposite to the feeding inlet 9 of the carbonization reactor, and the lower end of the central pyrolysis gas-phase product channel 6 is open in the material layer 4 of the carbonization reactor, and a pyrolysis gas-phase products outlet 7 is positioned at the upper part of the central pyrolysis gas-phase product channel 6.

A material channel for the solid materials is formed from top to bottom between the surrounding pyrolysis gas-phase product channel 3 and the central pyrolysis gas-phase product channel 6.

Figure 10:
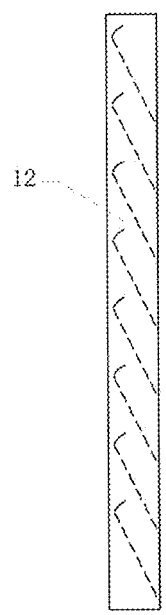
FIG. 10 is a structural diagram of the components formed by more than one internals of the invention.

As shown in FIG. 10, the interstices 12 arranged on the first internals 1 and the second internals 5 in this embodiment are interstices between the components formed by the more than one internals.

As shown in FIG. 3, the shape of the carbonization reactor in this embodiment is prismatic, and the surrounding pyrolysis gas-phase produce channel 3 is a wall channel which is formed between the wall of the carbonization reactor and the first internals 1 in the two opposite sides and separated by the material layer within which the central pyrolysis gas-phase product channel 6 is.

As shown in FIG. 9, in the embodiment, the interstices 12 are arranged on the second internals 5 which begin at one sixth length of the second internals 5 from the top end so that a top-enclosed space 13 with an outlet is formed in the upper part of the central pyrolysis gas-phase product channel 6.

In the embodiment, the lower ends of the surrounding pyrolysis gas-phase product channel 3 and the central pyrolysis gas-phase product channel 6 are arranged on the same horizontal level.

Embodiment 5

Figure 11:
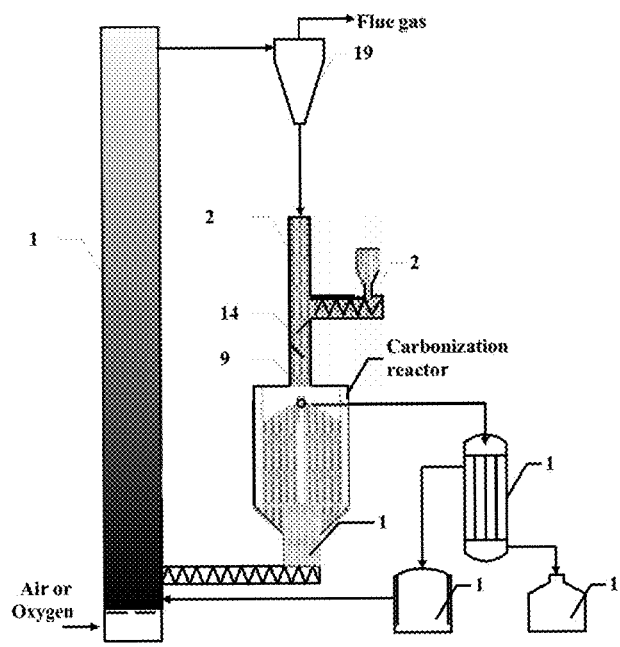
FIG. 11 is a flow diagram of the method based on the carbonization reactor of the invention.

As shown in FIG. 11, a carbonization method based on the above-mentioned carbonization reactor for hydrocarbon materials by solid heat carrier is provided. The related carbonization method includes the following steps:

1) The high-temperature solid heat carrier particles in an ash bin 20 and the hydrocarbon materials for carbonization in a feeding system 21 are fully mixed in a solid-solid mixer 14 to obtain the before-reaction solid materials;

2) The before-reaction solid materials enter the carbonization reactor from the feeding inlet 9 to undergo carbonization reaction; the produced gas-phase products from carbonization are discharged from a pyrolysis gas-phase product outlet 7 and enter a heat exchanger 15 to separate into gas and liquid, which are respectively stored in a gas storage 16 and a liquid storage 17; the produced solid materials after carbonization are discharged from a material outlet 10 and transmitted into a concurrent upward oxidation reactor 18 to obtain a gas-solid mixtures by reacting with air or oxygen supplied from the bottom of the oxidation reactor 18;

3) The gas-solid mixtures are separated by a cyclone separator 19, and the separated solid particles with high temperature are recycled into the solid-solid mixer 14 as high-temperature solid heat carrier particles, while the separated gases are discharged as flue gas and sent into downstream processing.

During the carbonization reaction in the step 2), the before-reaction solid materials are heated in the carbonization reactor to release gas-phase products, and the gas-phase products upward pass through the material layer 4 into an upper space 8 of the carbonization reactor, and then enter the surrounding pyrolysis gas-phase product channel 3 through the holes 11 or interstices 12 on the first internals 1, while the small particles are detained by the first internals 1 and thus return back into the material layer. Due to their own pressure, the gas-phase products in the surrounding pyrolysis gas-phase product channel 3 oppositely pass through the holes 11 or interstices 12 at the middle and lower part of the first internals 1 into the material layer 4, while the fine particle materials carried by the gas-phase products are accumulated at the bottom of the surrounding pyrolysis gas-phase product channel 3 under the effect of the first internals 1 and gravity and return back into the material layer 4. The gas-phase products suffer the filtration and reforming by the high-temperature particles of the material layer and the carried fine particles and heavy components are removed, and then pass through the holes 11 or the interstices 12 of the second internals 5 and enter the central pyrolysis gas-phase product channel 6, and finally are discharged from the pyrolysis gas-phase product outlet 7 into the heat exchanger 15.

In this embodiment, the directionally flowing of the pyrolysis gas-phase products in the carbonization reactor can achieve the objective of cleaning and dust removing, and the process of heat transfer and mass transfer between the particles can be strengthened, thus improve the utilization efficiency of materials and heat efficiency of system.

In this embodiment, the solid particles with high temperature obtained from combustion or oxidation process are used as the high-temperature solid heat carrier, and the cycle of heat carrier particles can be obtained by the integration of carbonization reactor and oxidation reactor 18, namely, the material outlet of the carbonization reactor is directly connected to the feeder unit of the oxidation reactor 18 and the hot flue gas discharged from the oxidation reactor 18 is separated by a cyclone separator 19, by which the separated solid particles with high temperature are stored in the ash bin 20 and then enter a solid-solid mixer 14 to mix with the hydrocarbon materials supplied by a feeding system 21, and then enter the carbonization reactor to complete carbonization reaction, thus the cycle of heat carrier particles is accomplished.

Embodiment 6

In this embodiment, the carbonization method used is the same as that in embodiment 5, and the used hydrocarbon material is oil shale. As shown in FIG. 11, the carbonization reactor is integrated with the oxidation reactor 18 in which oil shale semi-coke or char and pyrolysis gas generated by carbonization are used as fuel; the hot flue gas after combustion is separated by a cyclone separator 19, and the separated shale ashes with high temperature are mixed fully in the solid-solid mixer 14 with oil shale supplied by the feeding system, and then the mixtures enter the carbonization reactor to undergo carbonization reaction; the pyrolysis gas-phase products flow along the regulated path in the carbonization reactor, and the purified pyrolysis gas-phase products are discharged from the pyrolysis gas-phase product outlet 7 and enter the heat exchanger 15 of the post-processing and product collection system. After condensation, the shale oil is directly discharged as liquid-phase products, while the pyrolysis gas is stored in the gas storage and part of the pyrolysis gas returns back to the oxidation reactor 18 to be burned to keep the heat balance of the system. The solid products in the carbonization reactor are discharged from the material outlet 10 and the pyrolysis solid products comprise the shale ash and semi-coke, which can be used as the circulating bed material and fuel to undergo the combustion reaction in the oxidation reactor. The shale ashes with high temperature are separated by the cyclone separator and then enter the ash bin to be stored. Therefore, a cycle of particles is accomplished.

In this embodiment, the mixed fuels including pyrolysis gas and semi-coke are used to burn together in the oxidation reactor in order to provide the required heat for system, and the generated high-temperature solid heat carrier can be directly used to heat oil shale to undergo carbonization reaction. By regulating the pyrolysis gas-phase products to directionally flow in the carbonization reactor, the effect of heat transfer and mass transfer between the particles are strengthened. Meanwhile, the yield and quality of the shale oil can be improved by taking advantage of the structural feature of the internals in the reactor and the in-situ filtration and reforming by high-temperature particle bed layer. Particularly, the yield of shale oil is more than 1.2 times than that without the internals, and the content of dust is less than 0.5 wt. %. The heat provided by burning part of the recycled pyrolysis gas in the oxidation reactor further improves the utilization and thermal efficiency of fuel.

Embodiment 7

In this embodiment, the pyrolysis method is the same as that in embodiment 5, and the used hydrocarbon material is bituminous coal. As shown in FIG. 11, the carbonization reactor is integrated with the oxidation reactor 18 in which semi-coke generated by carbonization is used as fuel, and the hot flue gas after combustion is separated by a cyclone separator 19; the separated ashes with high temperature are mixed fully in the solid-solid mixer 14 with the bituminous coal supplied by the feeding system, and then the mixtures enter the carbonization reactor to undergo carbonization reaction; the pyrolysis gas-phase products flow along the regulated path in the carbonization reactor, and the purified pyrolysis gas-phase products are discharged from the pyrolysis gas-phase product outlet 7 and enter the heat exchanger 15 of the post-processing and product collection system. After condensation, pyrolysis oils are obtained as the pyrolysis liquid-phase products, while the pyrolysis gas enters the gas storage to be stored. The solid products in the carbonization reactor are discharged from the material outlet 10 and the pyrolysis solid products comprise the coal ashes and semi-coke, which can be used as the circulating bed material and fuel to undergo the combustion reaction in the oxidation reactor. The ashes with high temperature are separated by the cyclone separator and then enter the ash bin to be stored. Therefore, a cycle of particles is accomplished.

In this embodiment, by regulating the pyrolysis gas-phase products to directionally flow in the carbonization reactor, the process of heat and mass transfer between the particles are strengthened. Meanwhile, the yield and quality of the pyrolysis oil can be improved by taking advantage of the structural feature of the internals in the reactor and the in-situ filtration and reforming by high-temperature particle bed layer. Particularly, the yield of the pyrolysis oil is more than 1.3 times than that without the internals, and the content of dust is less than 1 wt. %.

Embodiment 8

In this embodiment, the used carbonization method is the same as that in embodiment 5, and the used hydrocarbon material is biomass (such as distiller's grain, drug dregs, sauce dregs, fungus dregs, etc.). As shown in FIG. 11, the carbonization reactor is integrated with the oxidation reactor 18 in which the semi-coke generated by carbonization is used as fuel. The hot flue gas after combustion is separated by a cyclone separator 19, and the separated ashes with high temperature are mixed fully in the solid-solid mixer 14 with the biomass (such as distiller's grain, drug dregs, sauce dregs, fungus dregs, etc.) supplied by the feeding system, and then the mixtures enter the carbonization reactor to undergo carbonization reaction; the pyrolysis gas-phase products flow along the regulated path in the carbonization reactor, and the purified pyrolysis gas-phase products are discharged from the pyrolysis gas-phase product outlet 7 and enter the heat exchanger 15 of the post-processing and product collection system. After condensation, pyrolysis oils are obtained as the pyrolysis liquid-phase products, while the pyrolysis gas enters the gas storage to be stored. The solid products in the carbonization reactor are discharged from the material outlet 10, and the pyrolysis solid products comprise the biomass ashes and the semi-coke, which can be used as the circulating bed material and fuel to undergo the combustion reaction in the oxidation reactor. The ashes with high temperature are separated by the cyclone separator and then enter the ash bin to be stored. Therefore, a cycle of particles is accomplished.

In this embodiment, by regulating the pyrolysis gas-phase products to directionally flow in the carbonization reactor, the process of heat and mass transfer between the particles are strengthened. Meanwhile, the yield and quality of the pyrolysis oil can be improved by taking advantage of the structural feature of the internals in the reactor and the in-situ filtration and reforming by high-temperature particle bed layer. Particularly, the yield of the pyrolysis oil is more than 1.2 times than that without the internals, and the content of dust is less than 1 wt. %.

Embodiment 9

In this embodiment, the used carbonization method is the same as that in embodiment 5, and the used hydrocarbon material is household waste. As shown in FIG. 11, the carbonization reactor is integrated with the oxidation reactor 18 in which the semi-coke generated by pyrolysis is used as fuel. The hot flue gas after combustion is separated by a cyclone separator 19, and the separated ashes with high temperature are mixed fully with the household waste supplied by the feeding system in the solid-solid mixer 14, and then the mixtures enter the carbonization reactor to undergo carbonization reaction; the pyrolysis gas-phase products flow along the regulated path in the carbonization reactor, and the purified pyrolysis gas-phase products are discharged from the pyrolysis gas-phase product outlet 7 and enter the heat exchanger 15 of the post-processing and product collection system. After condensation, pyrolysis oils are obtained as the pyrolysis liquid-phase products, while the pyrolysis gas enters the gas storage to be stored. The solid products in the carbonization reactor are discharged from the material outlet 10, and the pyrolysis solid products comprise the ashes of the household waste and the semi-coke, which can be used as the circulating bed material and fuel to undergo the combustion reaction in the oxidation reactor. The ashes with high temperature are separated by the cyclone separator and then enter the ash bin to be stored. Therefore, a cycle of particles is accomplished.

In this embodiment, by regulating the pyrolysis gas-phase products to directionally flow in the carbonization reactor, the process of heat transfer and mass transfer between the particles are strengthened. Meanwhile, the yield and quality of the pyrolysis oil can be improved by taking advantage of the structural feature of the internals in the reactor and the in-situ filtration and reforming by high-temperature particle bed layer. Particularly, the yield of the pyrolysis oil is more than 1.2 times than that without the internals, and the content of dust is less than 0.5 wt. %.

Embodiment 10

In this embodiment, the used carbonization method is the same as that in embodiment 5, and the used hydrocarbon material is electrical components. As shown in FIG. 11, the carbonization reactor is integrated with the oxidation reactor 18 in which the semi-coke generated by pyrolysis is used as fuel. The hot flue gas after combustion is separated by a cyclone separator 19, and the separated ashes with high temperature are mixed fully in the solid-solid mixer 14 with the electrical components supplied by the feeding system, and then the mixtures enter the carbonization reactor to undergo carbonization reaction; the pyrolysis gas-phase products flow along the regulated path in the carbonization reactor, and the purified pyrolysis gas-phase products are discharged from the pyrolysis gas-phase product outlet 7 and enter the heat exchanger 15 of the post-processing and product collection system. After condensation, pyrolysis oils are obtained as the pyrolysis liquid-phase products, while the pyrolysis gas enters the gas storage to be stored. The solid products in the carbonization reactor are discharged from the material outlet 10, and the pyrolysis solid products comprise the ashes of the electrical components and the semi-coke, which can be used as the circulating bed material and fuel to undergo the combustion reaction in the oxidation reactor. The ashes with high temperature are separated by the cyclone separator and then enter the ash bin to be stored. Therefore, a cycle of particles is accomplished.

In this embodiment, by regulating the pyrolysis gas-phase products to directionally flow in the carbonization reactor, the process of heat and mass transfer between the particles are strengthened. Meanwhile, the yield and quality of the pyrolysis oil can be improved by taking advantage of the structural feature of the internals in the reactor and the in-situ filtration and reforming by high-temperature particle bed layer. Particularly, the yield of the pyrolysis oil is more than 1.3 times than that without the internals, and the content of dust is less than 1 wt. %.

Embodiment 11

In this embodiment, the used carbonization method is the same as that in embodiment 5, and the used hydrocarbon material is the absorbent particles with absorbed organic matters. As shown in FIG. 11, the carbonization reactor is integrated with the oxidation reactor 18 in which the semi-coke generated by pyrolysis is used as fuel. The hot flue gas after combustion is separated by a cyclone separator 19, and the separated ashes with high temperature are mixed fully with the absorbent particles with absorbed organic matters supplied by the feeding system in the solid-solid mixer 14, and then the mixtures enter the carbonization reactor to undergo carbonization reaction; the pyrolysis gas-phase products flow along the regulated path in the carbonization reactor, and the purified pyrolysis gas-phase products are discharged from the pyrolysis gas-phase product outlet 7 and enter the heat exchanger 15 of the post-processing and product collection system. After condensation, pyrolysis oils are obtained as the pyrolysis liquid-phase products, while the pyrolysis gas enters the gas storage to be stored. The solid products in the carbonization reactor are discharged from the material outlet 10 and the pyrolysis solid products comprise the ashes of the absorbent particles with absorbed organic matters and the semi-coke, which can be used as the circulating bed material and fuel to undergo the combustion reaction in the oxidation reactor. The ashes with high temperature are separated by the cyclone separator and then enter the ash bin to be stored. Therefore, a cycle of particles is accomplished.

In this embodiment, by regulating the pyrolysis gas-phase products to directionally flow in the carbonization reactor, the process of heat transfer and mass transfer between the particles are strengthened. Meanwhile, the yield and quality of the pyrolysis oil can be improved by taking advantage of the structural feature of the internals in the reactor and the in-situ filtration and reforming by high-temperature particle bed layer. Particularly, the yield of the pyrolysis oil is more than 1.2 times than that without the internals, and the content of dust is less than 0.5 wt. %.

Embodiment 12

In this embodiment, the used carbonization method is the same as that in embodiment 5, and the used hydrocarbon material is the used catalyst. As shown in FIG. 11, the carbonization reactor is integrated with the oxidation reactor 18 in which the semi-coke generated by pyrolysis is used as fuel. The hot flue gas after combustion is separated by a cyclone separator 19, and the separated ashes with high temperature are mixed fully with the used catalyst supplied by the feeder system in the solid-solid mixer 14, and then the mixtures enter the carbonization reactor to undergo carbonization reaction; the pyrolysis gas-phase products flow along the regulated path in the pyrolysis reactor, and the purified pyrolysis gas-phase products are discharged from the pyrolysis gas-phase product outlet 7 and enter the heat exchanger 15 of the post-processing and products collection system. After condensation, pyrolysis oils are obtained as the pyrolysis liquid-phase products, while the pyrolysis gas enters the gas storage to be stored. The solid products in the carbonization reactor are discharged from the material outlet 10, and the pyrolysis solid products comprise the ashes of the used catalyst and the semi-coke, which can be used as the circulating bed material and fuel to undergo the combustion reaction in the oxidation reactor. The ashes with high temperature are separated by the cyclone separator and then enter the ash bin to be stored. Therefore, a cycle of particles is accomplished.

In this embodiment, by regulating the pyrolysis gas-phase products to directionally flow in the carbonization reactor, the process of heat transfer and mass transfer between the particles are strengthened. Meanwhile, the yield and quality of the pyrolysis oil can be improved by taking advantage of the structural feature of the internals in the reactor and the in-situ filtration and reforming by high-temperature particle bed layer. Particularly, the yield of the pyrolysis oil is more than 1.2 times than that without the internals, and the content of dust is less than 1 wt. %.

Embodiment 13

In this embodiment, the used pyrolysis method is the same as that in embodiment 5, and the used hydrocarbon material is oil sand. As shown in FIG. 11, the carbonization reactor is integrated with the oxidation reactor 18 in which the semi-coke generated by pyrolysis is used as fuel. The hot flue gas after combustion is separated by a cyclone separator 19, and the separated ashes with high temperature are mixed fully with oil sand supplied by the feeder system in the solid-solid mixer 14, and then the mixtures enter the carbonization reactor to undergo carbonization reaction; the pyrolysis gas-phase products flow along the regulated path in the carbonization reactor, and the purified pyrolysis gas-phase products are discharged from the pyrolysis gas-phase product outlet 7 and enter the heat exchanger 15 of the post-processing and product collection system. After condensation, pyrolysis oils are obtained as the pyrolysis liquid-phase products, while the pyrolysis gas enters the gas storage to be stored. The solid products in the carbonization reactor are discharged from the material outlet 10, and the pyrolysis solid products comprise the oil sand ashes and the semi-coke, which can be used as the circulating bed material and fuel to undergo the combustion reaction in the oxidation reactor. The ashes with high temperature are separated by the cyclone separator and then enter the ash bin to be stored. Therefore, a cycle of particles is accomplished.

In this embodiment, by regulating the pyrolysis gas-phase products to directionally flowing in the carbonization reactor, the process of heat and mass transfer between the particles are strengthened. Meanwhile, the yield and quality of pyrolysis oil can be improved by taking advantage of the structural feature of the internals in the reactor and the in-situ filtration and reforming by high-temperature particle bed layer. Particularly, the yield of pyrolysis oil is more than 1.3 times than that without the internals, and the content of dust is less than 1 wt. %.

It should be pointed out that modifications and improvements may be still performed on specific implementation method of the carbonization reactor, such as the shape of holes and baffle plates, the opening type of baffle plates, the size of each unit, the installation space and patterns, the integration method between the carbonization reactor and other apparatus or units and the consequent operation, etc. All of these, however, will not depart from the scope and the basis spirit of the invention specified in the claims.

What is claimed is:

1. A carbonization reactor for hydrocarbon materials by solid heat carrier, the carbonization reactor comprising:
   a first internal partition wall with a plurality of first holes or a plurality of first interstices that is fixed to a top of the carbonization reactor, and a surrounding pyrolysis gas-phase product channel is formed between the first internal partition wall and a wall of carbonization reactor and the base of the surrounding pyrolysis gas-phase product channel is open to a solid material layer of the carbonization reactor;
   a second internal partition wall with plurality of second holes or plurality of second interstices is mounted in the center of the carbonization reactor, and therein a central pyrolysis gas-phase product channel is formed, and the central pyrolysis gas-phase product channel has its top end closed which is vertically opposite to the feeding inlet of the carbonization reactor, and the bottom of the central pyrolysis gas-phase product channel is open in the material layer of the carbonization reactor, and a pyrolysis gas-phase product outlet is positioned at the top of the central pyrolysis gas-phase product channel; and
   a material channel for a solid materials being formed from the top to a bottom between the surrounding pyrolysis gas-phase product channel and the central pyrolysis gas-phase product channel;
   wherein the surrounding pyrolysis gas-phase product channel is an annular interconnected channel, or a wall channel which is formed between the wall of carbonization reactor and the first internal partition wall in the two opposite sides of the carbonization reactor and separated by the material layer within which the central pyrolysis gas-phase product channel is,
   wherein the plurality of second holes or plurality of second interstices is arranged in the second internal partition wall which begin at one tenth to one third length of the second internal wall from the top end so that a top-enclosed space with an outlet is formed in the top of the central pyrolysis gas-phase product channel, and wherein the base of the of the surrounding pyrolysis gas-phase product channel and central pyrolysis gas-phase product channel are arranged on the same horizontal level.

2. The carbonization reactor for hydrocarbon materials by solid heat carrier according to claim 1, wherein the holes are one or more kinds of holes in rhombic, rectangular or circular shape.

3. The carbonization reactor for hydrocarbon materials by solid heat carrier according to claim 1, wherein the interstices are a kind of louver-shape interstices, or interstices between components of the internals forming the central pyrolysis gas-phase product channel.

4. The carbonization reactor for hydrocarbon materials by solid heat carrier according to claim 1, wherein a shape or configuration of the carbonization reactor is cylindrical or prismatic.

5. A carbonization method based on the carbonization reactor for hydrocarbon materials by solid heat carrier according to claim 1, the method comprising:
- fully mixing the solid heat carrier particles with high temperature in an ash bin and the hydrocarbon materials for carbonization in a feeding system in a solid-solid mixer to obtain a before-reaction solid materials;
- inputting and heating the before-reaction solid materials into the carbonization reactor from the feeding inlet to release gas-phase products;
- upward passing the gas-phase products into the top of the carbonization reactor through the solid material layer;
- passing the gas-phase products into surrounding pyrolysis gas-phase product channel through the holes or interstices on the first internal partition wall;
- successively passing the gas-phase products into the central pyrolysis gas-phase product channel through the holes or interstices on the first internal partition wall, the solid material layer and the holes or interstices on the second internal partition wall; and
- finally discharging the gas-phase products into a post-processing and product collection system through the pyrolysis gas-phase product outlet.

6. The carbonization method according to claim 5, wherein the carbonization method further includes:
- discharging the pyrolysis gas-phase products obtained from carbonization to a post-processing and product collection system from the pyrolysis gas-phase product outlet;
- discharging a produced solid materials after carbonization from a material outlet to a concurrent upward oxidation reactor to obtain a gas-solid mixture by reacting with the air or oxygen supplied from the bottom of the oxidation reactor;
- separating the gas-solid mixtures by a cyclone separator to obtain separated solid particles and separated gases; and
- recycling the separated solid particles with high temperature into the solid-solid mixer as the solid heat carrier particles, while discharging the separated gases as flue gas to downstream processing.

7. The carbonization method according to claim 5, wherein the hydrocarbon materials are fluidizing solid particles that are rich in hydrogen and carbon.

* * * * *